United States Patent [19]
Osafune et al.

[11] Patent Number: 5,262,469
[45] Date of Patent: Nov. 16, 1993

[54] OXYNITRIDE GLASS FIBER FOR COMPOSITE PRODUCTS, AND GLASS FIBER-REINFORCED PRODUCTS

[75] Inventors: Haruo Osafune; Hiroyoshi Minakuchi, both of Kyoto, Japan

[73] Assignee: Shimadzu Corporation, Kyoto, Japan

[21] Appl. No.: 986,296

[22] Filed: Dec. 7, 1992

[30] Foreign Application Priority Data

Dec. 13, 1991 [JP] Japan .................. 3-352304
Jan. 28, 1992 [JP] Japan .................. 4-038679

[51] Int. Cl.$^5$ .................................. C08K 3/40
[52] U.S. Cl. ...................... 524/494; 428/373; 428/391; 428/417; 428/429; 428/447; 428/902; 523/203; 523/217
[58] Field of Search ............ 428/373, 391, 417, 429, 428/446, 447, 902, 698, 285, 288; 524/494; 523/203, 217

[56] References Cited

U.S. PATENT DOCUMENTS

| | | | |
|---|---|---|---|
| 4,035,550 | 7/1977 | Suh et al. | 428/339 |
| 4,056,651 | 11/1977 | Scola | 428/336 |
| 4,230,769 | 10/1980 | Goossens | 428/412 |
| 4,358,502 | 11/1982 | Dunbar | 428/283 |
| 4,455,343 | 6/1984 | Temple | 428/285 |
| 4,457,970 | 7/1984 | Das | 428/290 |
| 4,808,478 | 2/1989 | Dana et al. | 428/391 |
| 4,835,057 | 5/1989 | Bagley et al. | 428/391 |
| 4,863,794 | 9/1989 | Fujii et al. | 428/325 |
| 4,868,063 | 9/1989 | Okamura et al. | 428/429 |
| 5,024,902 | 6/1991 | Suganuma et al. | 428/388 |
| 5,069,971 | 12/1991 | Waketa et al. | 428/391 |
| 5,114,785 | 5/1992 | Tenhover et al. | 428/391 |
| 5,141,802 | 8/1992 | Parrinello et al. | 428/391 |

FOREIGN PATENT DOCUMENTS 0293105 11/1988 European Pat. Off.

OTHER PUBLICATIONS

Derwent Publications Ltd., Database WPIL Week 03, #AN 89-020523.
Chemical Abstracts, vol. 114, No. 24, Abstract No. 233676n, Columbus, Ohio.

*Primary Examiner*—James J. Bell
*Attorney, Agent, or Firm*—Wegner, Cantor, Mueller & Player

[57] ABSTRACT

The invention relates to an oxynitride glass fiber for composite products which has a surface cladding formed from a composition containing a silane coupling agent. This fiber is excellent in strength, elastic modulus, adhesion and wetting property with respect to matrix resin. A composite product comprising the above clad oxynitride glass fiber and a thermaplastic or thermosetting resin matrix is also disclosed. This composite is excellent in strength, elastic modulus, toughness and interlaminar shear resistance.

7 Claims, 1 Drawing Sheet

OXYNITRIDE GLASS FIBER FOR COMPOSITE PRODUCTS, AND GLASS FIBER-REINFORCED PRODUCTS

FIELD OF THE INVENTION

The present invention relates to a clad oxynitride glass fiber for composite products and to a fiber-reinforced plastic (FRP) product reinforced with said glass fiber.

BACKGROUND OF THE INVENTION

In recent years, a variety of composite products each comprising a plastic or other structural matrix and a reinforcing fiber have been commercially implemented. Through the combination of a matrix material with a fiberous material, such composite products have many desirable properties, such as high tensile strength, high rigidity and low coefficient of thermal expansion, which cannot be provided by the matrix or the reinforcing fiber as used alone. The reinforcing fiber heretofore commonly employed includes E glass fiber, S glass fiber, aramid fiber, carbon fiber and so on.

It is known that when such a fiber is incorporated as a reinforcing fiber in a thermoplastic resin matrix, the heat resistance, mechanical strength and dimensional stability of resin products are generally improved. However, with E glass, the strength, elasticity and chemical resistance of composite products are not as high as desired, while the use of S fiber results in inadequate elastic modulus. Aramid fiber is so poor in adhesion to resin that the interlaminar shear strength of products is extremely poor. As to carbon fiber-reinforced plastics, because of the low elongation at break and low toughness at failure of the fiber itself, there is the constant risk of sudden destruction and consequent hazard. Pitch-based carbon fiber, in particular, is so poor in adhesion to resin that it is not suited for reinforcing of plastics. Moreover, it cannot be used in applications where electrical insulation is a necessary characteristic.

Recently, oxynitride glass fiber is gathering attention as a reinforcing material for composite products because of its high heat resistance. Oxynitride glass can structurally be envisaged as an oxide glass in which some oxygen atoms have been replaced by nitrogen atoms and because it has a larger number of bonds than the oxide glass, features higher elastic modulus and hardness characteristics.

The general process for manufacturing such a glass fiber comprises extruding a molten glass from a nozzle at a high speed and taking up the resulting tow of filaments after solidification. However, glass fiber in general is vulnerable to mechanical stresses, particularly frictional forces, and when its surface is damaged, is readily broken. Therefore, it is essential to prevent direct contact of the adjacent monofilaments as well as contact thereof with the production hardware in the course of manufacture from spinning to takeup. For this reason, the glass monofilaments emerging from the spinneret nozzle are immediately coated with a cladding agent for protection, then bundled and taken up. The cladding agent used for this purpose generally contains a binder, such as polyvinyl alcohol, starch, methylcellulose or the like, a coupling agent, a softener (cationic surfactant), and a chemical destaticizer, for instance.

However, when the glass fiber so clad is used to reinforce a matrix resin, the presence of such a protective surface film proves to be a drawback. When the reinforcing fiber has such a surface film, the adhesion between the reinforcing fiber and the matrix resin is adversely affected so that the resulting composite may not have a sufficient strength. Therefore, in the manufacture of composite products, it is common practice to heat the glass fiber for pyrolytic elimination of the binder or wash the fiber with a detergent and treat it with a coupling agent anew. However, the resulting thermal degradation of the fiber detracts remarkably from the strength of final FRP products.

It is, therefore, an object of the present invention to provide an oxynitride glass fiber suitable for use in the manufacture of composite products. It is another object to provide a fiber-reinforced plastic free of the above-mentioned drawbacks and having excellent mechanical characteristics.

SUMMARY OF THE INVENTION

The present invention provides an oxynitride glass fiber for composite products which has a surface film formed from a cladding composition comprising a silane coupling agent having at least one kind of functional group selected from the class consisting of vinyl, epoxy and amino groups.

The invention further provides a fiber-reinforced plastic product comprising a reinforcing oxynitride glass treated with a cladding composition comprising a silane coupling agent and a thermosetting or thermoplastic resin matrix.

DETAILED DESCRIPTION OF THE INVENTION

Figure 1:
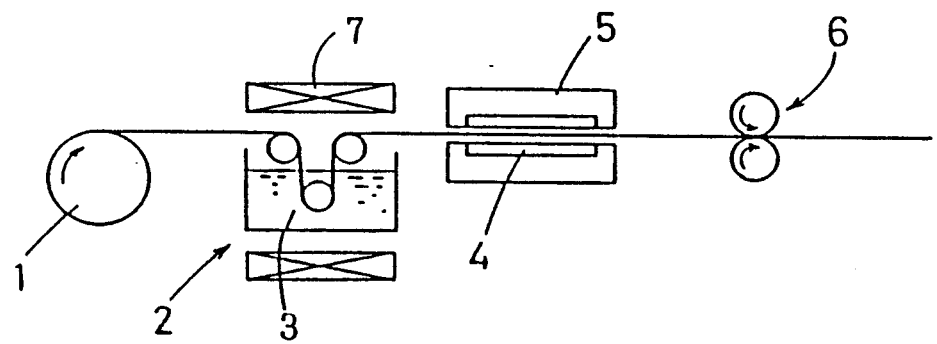
FIG. 1 is a schematic diagram showing an exemplary manufacturing setup for the production of glass fiber-reinforced plastics.

The oxynitride glass to be used as reinforcing fiber in the present invention is high in heat resistance for the reason mentioned hereinbefore. As specific examples of such heat-resistant oxynitride glass, there may be mentioned those species having the compositions of Ca-Si-Al-O-N, Na-Ca-Si-O-N, La-Si-Al-O-N, Na-B-Si-O-N, Mg-Si-Al-O-N, Si-Al-O-N, Y-Al-Si-O-N, Na-B-Al-P-O-N and so on.

These species of oxynitride glass can be produced by smelting, the sol-gel process, Na gas blow method, or treating a porous glass with $NH_3$ gas, among others. Generally, however, the smelting process is preferred.

The particularly preferred oxynitride glass fiber in the practice of the invention has the composition represented by the formula $Si-M_1-M_2-O-N$ wherein $M_1$ represents either Ca or Ca+Mg; $M_2$ represents at least one metal selected from the group consisting of Al, Sr, La, Ba, Y, Ti, Zr, Ce, Na, K, Sb, B, Cr, Pb, V and Sn, and satisfies the following mole percentage relations:

$$65 \leq (SiO_2 + 3Si_3N_4 + M_1O) \times 100/(100 + 2Si_3N_4) < 100 \quad \text{(a)}$$

$$0.7 \leq (SiO_2 + 3Si_3N_4)/M_1O \leq 2.3 \quad \text{(b)}$$

The more preferred glass fiber contains 0 to 40 mole % of $SiO_2$, 26 to 70 mole % of CaO, 0 to 20 mole % of MgO and not more than 22 atomic % of $M_2$.

As mentioned above, the general process for manufacturing such a glass fiber comprises extruding a molten glass from a nozzle at a high speed and taking up the resulting tow of filaments after solidification. However, glass fiber in general is vulnerable to mechanical forces, particularly frictional forces, and when its surface is damaged, is readily broken. Therefore, it is essential to prevent direct contact of the adjacent monofilaments as well as contact thereof with the production hardware in the course of manufacture from spinning to takeup. For this reason, the glass filaments emerging from the spinneret nozzle are immediately coated with a cladding agent for protection, then bundled and taken up. The cladding agent used for this purpose generally contains a binder, such as polyvinyl alcohol, starch, methylcellulose, etc., a coupling agent, a softener (cationic surfactant), and a chemical destaticizer, for instance. These ingredients are selected according to the matrix material. The form of glass fiber is optional, thus being any of cloth, roving, yarn, staple, chopped strand, wool, paper, mat and so on.

The binder serves to protect the surface of glass filaments and bundle the filaments, and any of the aqueous plastic emulsions in common use for surface treatment of glass fiber can be employed. For example, emulsions of polyester, polyurethane, epoxy, polyvinyl acetate and other polymers or the corresponding copolymers with ethylene or the like as well as starch, PVA, acrylic and rubber emulsions can be employed with advantage. In the selection of binders, compatibility or wettability with respect to the matrix resin, among other things, must be considered. Moreover, attention should be paid to requirements from the production side, i.e. the manufacturing stage for composite products, such as film hardness, cuttability, handle and so on.

The coupling agent has an important bearing on adhesion between glass fiber and matrix resin. The coupling agent to be used in the invention contains a vinyl, epoxy or amino group.

The vinyl-containing silane coupling agent includes, among others, vinyltrichlorosilane, vinyltris ($\beta$-methoxyethoxy)silane, vinyltriethoxysilane, vinyltrimethoxysilane, $\gamma$-methacryloxypropyltrimethoxysilane and so on.

The epoxy-containing coupling agent includes, among others, $\beta$-(3,4-epoxycyclohexyl)ethyltrimethoxysilane, $\gamma$-glycidoxypropyltrimethoxysilane, $\gamma$-glycidoxypropylmethyldimethoxysilane and so on.

The amino-containing coupling agent includes, among others, N-$\beta$(aminoethyl)-$\gamma$-aminopropyltrimethooxysilane, N-$\beta$(aminoethyl)-$\alpha$-aminopropylmethyldimethoxysilane, $\gamma$-aminopropyltriethoxysilane, N-phenyl-$\gamma$-aminopropyltrimethoxysilane, $\gamma$-mercaptopropyltrimethoxysilane, $\gamma$-chloropropyltrimethoxysilane and so on.

The proportion of said coupling agent is about 0.05 to 5.0% by weight based on the total cladding composition. If the proportion of the coupling agent is below the above range, the incidence of napping of the tow and breakage of the filaments is increased. If the proportion exceeds the above range, the strength of the FRP is sacrified.

The surfactant may be any of cationic, anionic and nonionic surfactants but cationic or anionic surfactants are preferred in view of the surface charge of glass fiber. Cationic surfactants are most desirable. As such cationic surfactants, there can be mentioned fatty acid amides, alkylimidazolines, alkylammonium salts and so on.

The cladding composition may further contain a lubricant, an antistatic agent and other additives. The lubricant includes, among others, polyethylene glycol and vegetable oils. The antistatic agent includes, among others, ammonium chloride, lithium chloride and so on. The effects equivalent to those of such lubricant and antistatic agent may be obtained by using suitable surfactants.

To prepare the cladding composition, the various ingredients mentioned above are dissolved or dispersed in water in the per se known manner. The cladding composition can be applied to glass fiber by any of the known techniques such as dipping, roll coating, spraying and so on. The glass fiber treated with the cladding composition is then dried, whereupon a protective film is formed on the surface of the glass fiber. The amount of nonvolatile matter deposited on the glass fiber is preferably 0.1 to 3.0%.

Meanwhile, the thermosetting resin which can be used as resin matrix for the glass fiber-reinforced plastic according to the invention includes vinyl ester resin and epoxy resin, for instance. The vinyl ester and epoxy resin both include varieties of species according to the kind of monomeric vinyl ester or epoxy compound used as the starting material. Thus, as said epoxy resin, bisphenol, novolac and modefied epoxy resins, among others, can be employed.

Thus, glycidyl ether epoxy resin (bisphenol A, F, S and movolac), alicyclic epoxy resin, glycidylamine epoxy resin, heterocyclic epoxy resin and so on can be employed.

When vinyl ester resin is used as matrix resin, a cladding composition comprising a vinyl-containing silane coupling agent is employed. When an epoxy resin is used as matrix resin, a cladding composition comprising an epoxy-or/and amino-containing silane coupling agent is employed.

The thermoplastic resin which can be used as matrix resin in the glass fiber-reinforced plastic product according to the present invention includes, among others, polycarbonate resin, polyamide such as nylon-6, nylon-66, etc.; polyolefin resin such as polyethylene, polyropylene, etc.; polyester resin such as polyethylene terephthalate, polybutylene terephthalate, etc.; fluororesin such as polyvinylidene fluoride, polytetrafluoroethylene, etc.; polyurethane resin; and styrene resin such as acrylonitrile-styrene copolymer (AS), acrylonitrile-butadiene-styrene copolymer (ABS) and so on.

In the glass fiber-reinforced plastic of the invention, the proportion of oxynitride glass is 20 to 70% by volume.

Thus, a tow of oxynitride glass filaments emerging from the spinneret nozzle is treated with said cladding composition and taken up at a high speed. The glass fiber having such a surface film is dipped in a thermosetting or thermoplastic resin bath, withdrawn and cooled for solidification.

The following examples are further illustrative of the invention.

EXAMPLE 1

A tow of 58 oxynitride glass monofilaments (12 $\mu$m in diameter) (8.6 mole % of $SiO_2$, 19.4 mole % of $Si_3N_4$, 59.8 mole % of CaO, 6.9 mole % of MgO, 5.2 mole % of $Al_2O_3$; tensile strength 400 kg/mm$^2$, elastic modulus in tension 21,000) withdrawn from a melt-spinning furnance (1780° C.) was coated with the cladding composition shown below in Table 1 by means of an applicator. The filaments were then bundled and taken up as a single strand on a bobbin (cake). This strand cake was heat-treated at 100° C. for 10 hours and, then, 25 strands were bundled and taken up to prepare a roving.

TABLE 1

| Ingredient | Weight % |
| --- | --- |
| γ-Aminopropyltrimethoxysilane | 0.5 |
| Ethylene-vinyl acetate emulsion (Kuraray, OM6000) | 3 |
| Fatty acid amide | 0.3 |
| Water | Balance |

Using the manufacturing setup illustrated in FIG. 1, 65 rovings prepared as above were paid out from a feed roller 1. The rovings were dipped in a resin solution 3, the composition of which is shown below in Table 2, in a resin tank 2. The rovings thus treated were passed through a metal mold 4, cured at 150° C. in a furnance 5 and drawn out by a pair of rollers 6 (0.5 m/min.) to give a rectangular bar specimen 6×3 mm (fiber content 60% by volume). The physical properties of this FRP bar are shown in Table 11.

TABLE 2

| Ingredient | Weight % |
| --- | --- |
| Bisphenol A diglycidyl ether (Ciba-Geigy, CT-200) | 100 |
| 3-Methyltetrahydrophthalic anhydride (Ciba-Geigy, HT-903) | 30 |

EXAMPLE 2

Rovings were prepared using the cladding composition indicated in Table 3 and an FRP bar was manufactured in the same manner as Example 1 except that the resin solution of Table 4 was employed.

TABLE 3

| Ingredient | Weight % |
| --- | --- |
| γ-Glycidyloxypropyltrimethoxysilane | 0.5 |
| Epoxy emulsion (Yoshimura Yuka, KE-300) | 3 |
| Fatty acid amide | 0.3 |
| Water | Balance |

TABLE 4

| Ingredient | Weight % |
| --- | --- |
| Phenol-novolac epoxy resin (Yuka Shell, Epikote 152) | 100 |
| Hexahydrophthalic anhydride | 69 |

EXAMPLE 3

Rovings were prepared using the cladding composition indicated in Table 5 and an FRP bar was manufactured in the same manner as Example 1 except that the resin solution of Table 6 was employed.

TABLE 5

| Ingredient | Weight % |
| --- | --- |
| β-(3,4-Epoxycyclohexyl)ethyltrimethoxysilane | 0.5 |
| Epoxy emulsion (Yoshimura Yuka, KE-300) | 3 |
| Fatty acid amide | 0.3 |
| Water | Balance |

TABLE 6

| Ingredient | Weight % |
| --- | --- |
| Bisphenol A diglycidyl ether (Ciba-Geigy, CT-200) | 100 |
| 3-Methyltetrahydrophthalic anhydride (Ciba-Geigy, HT-903) | 30 |

EXAMPLE 4

Rovings were prepared using the cladding composition indicated in Table 7 and an FRP bar was manufactured in the same manner as Example 1 except that the resin solution of Table 8 was employed. However, the mold temperature was controlled at 80°-90° C. at the inlet, 135° C. in the intermediate position and 125° C. at the exit.

TABLE 7

| Ingredient | Weight % |
| --- | --- |
| γ-Methacryloxypropyltrimethoxysilane | 0.5 |
| Ethylene-vinyl acetate emulsion | 3 |
| Fatty acid amide | 0.3 |
| Water | Balance |

TABLE 8

| Ingredient | Weight % |
| --- | --- |
| Vinyl ester resin (Showa Polymer, Ripoxy R802) | 100 |
| Methyl ethyl ketone peroxide | 1.5 |
| Cobalt naphthenate | 0.5 |

EXAMPLE 5

Using the cladding composition shown in Table 9, rovings were prepared in otherwise the same manner as Example 1.

TABLE 9

| Ingredient | Weight % |
| --- | --- |
| γ-Aminopropyltriethoxysilane | 0.5 |
| Epoxy resin emulsion (Yoshimura Yuka, KE-300) | 3 |
| Fatty acid amide | 0.3 |
| Water | Balance |

Using the manufacturing setup schematically illustrated in FIG. 1, 65 rovings prepared as above were paid out from the feed roller 1 and passed through a molten polycarbonate resin 3 (preheated to 350° C.) in the resin tank 2. The rovings were then passed through the metal mold 4 equipped with heating furnance 5 (mold temperature: 300° C. at the inlet, 250° C. in the intermediate position and 150° C. at the exit) and drawn out by the pair of rollers 6 (0.5 m/min.) to prepare a rectangular bar 6×3×100 mm (fiber content 60% by volume). The physical properties of this FRT bar are presented in Table 11.

EXAMPLE 6

TABLE 10

| Ingredient | Weight % |
| --- | --- |
| N-(β-aminoethyl)-γ-aminopropyl-trimethoxysilane | 0.5 |
| Epoxy resin emulsion (Yoshimura Yuka, KE-300) | 3 |
| Fatty acid amide | 0.3 |
| Water | Balance |

Using the cladding composition shown in Table 10 above, rovings were prepared in otherwise the same manner as Example 1. These rovings were then dipped in molten nylon-6 (380° C.) in the resin tank 2 and further passed through the mold (330° C. at the inlet, 260° C. in the intermediate position and 150° C. at the outlet) in otherwise the same manner as Example 1 to manufacture a rectangular bar (fiber content 60% by volume). The physical properties of this FRTP bar are presented in Table 11.

COMPARATIVE EXAMPLES 1-3

Using the following commercial reinforcing fibers, FRTP bars were manufactured in the same manner as Example 1. The results are shown in Table 11.

Comparative Example 1 (GFRP)

carbon fiber Torayca T-300, manufactured by Toray Industries, Inc.

Comparative Example 2 (GFRP)

E glass fiber: Glasron, manufactured by Asahi Glass Fiber Co., Ltd.

Comparative Example 3 (AFRP)

aramid fiber, Gevler 49, manufactured by du Pont.

METHODS FOR DETERMINING PHYSICAL PROPERTIES

The physical properties of the FRP bars manufactured in Examples 1 through 6 and Comparative Examples 1 through 3 were determined as follows. It should be understood that the proportion of reinforcing fiber was 60% by volume in all the bars.

Tensite strength: JIS K7054.
Elastic modulus in tension: JIS K7054
Interlaminar shear strength: ILSS (JIS K7057)
Izod impact strength: JIS 6911

TABLE 11

| Property | Example 1 | Example 2 | Example 3 | Example 4 | Example 5 | Example 6 | Comparative Example 1 | Comparative Example 2 | Comparative Example 3 |
| --- | --- | --- | --- | --- | --- | --- | --- | --- | --- |
| Tensile strength (kg/mm$^2$) | 160 | 170 | 170 | 160 | 190 | 180 | 170 | 130 | 140 |
| Elastic modulus in tension (t/mm$^2$) | 11 | 11.5 | 11 | 11 | 11.5 | 11 | 13 | 4.2 | 7 |
| Interlaminar shear strength (kg/mm$^2$) | 13 | 12 | 12 | 12 | | | 8 | 10 | 4 |
| Izod impact strength (kg · cm/ cm · notch) | 250 | 250 | 250 | 220 | 260 | 280 | 100 | 300 | 250 |

It is apparent from Table 11 that compared with the conventional fiber-reinforced plastics, the FRP according to the invention has a well-balanced assortment of all the necessary properties.

The glass fiber of the invention for composite products is not only excellent in strength and elastic modulus but also outstanding in adhesion and wetting properties with respect to matrix resins. The fiber-reinforced plastic of the invention is excellent not only in strength and elastic modulus but also in toughness (impact resistance) and interlaminar shear resistance.

What is claimed is:

1. An oxynitride glass fiber for composite products which comprises a glass fiber having a surface film formed from a cladding composition comprising a silane coupling agent having at least one functional group selected from the class consisting of vinyl, epoxy and amino groups.

2. A fiber-reinforced plastic product comprising an oxynitride glass fiber having a surface film formed from a cladding composition comprising a silane coupling agent and a thermosetting or thermoplastic resin matrix.

3. The fiber-reinforced plastic product of claim 2 wherein said thermoplastic resin is a polycarbonate, polyamide, polyolefin, polyester, fluorine-containing or styrene resin.

4. The fiber-reinforced plastic product of claim 2 wherein said silane coupling agent is γ-aminopropyl-triethoxysilane, and said thermoplastic resin is a polycarbonate.

5. The fiber-reinforced plastic product of claim 2 wherein said silane coupling agent is N-(β-aminoethyl)-γ-aminopropyltriethoxysilane, and said thermoplastic resin is a polyamide.

6. The fiber-reinforced plastic product of claim 2 which comprises an oxynitride glass fiber having a surface film formed from a cladding composition comprising a vinyl-containing silane coupling agent and a vinyl ester resin matrix.

7. The fiber-reinforced plastic product of claim 2 which comprises an oxynitride glass fiber having a surface film formed from a cladding composition comprising an epoxy-and/or amino-containing silane coupling agent and an epoxy resin matrix.

* * * * *